(12) United States Patent
Nguyen

(10) Patent No.: US 6,556,894 B1
(45) Date of Patent: Apr. 29, 2003

(54) SYSTEM FOR RESTRICTING USE OF A MEASURING APPARATUS

(75) Inventor: John H. Nguyen, Houston, TX (US)

(73) Assignee: TLV Company, Ltd., Hyogo-ken (JP)

( * ) Notice: Subject to any disclaimer, the term of this patent is extended or adjusted under 35 U.S.C. 154(b) by 0 days.

(21) Appl. No.: 09/108,738

(22) Filed: Jul. 1, 1998

(30) Foreign Application Priority Data

Jul. 22, 1997 (JP) ............................................. 9-212580

(51) Int. Cl.⁷ .............................................. G05B 13/02
(52) U.S. Cl. ....................... 700/275; 368/97; 368/101; 702/177
(58) Field of Search ................................ 705/9, 30, 32; 235/376, 381, 382; 700/275; 368/97, 101; 702/177

(56) References Cited

U.S. PATENT DOCUMENTS

| | | | |
|---|---|---|---|
| 4,727,750 A | 3/1988 | Yonemura | |
| 4,788,849 A | 12/1988 | Yonemura et al. | |
| 4,898,022 A | 2/1990 | Yumoto et al. | |
| 5,040,210 A | 8/1991 | Anderson | |
| 5,051,564 A | * 9/1991 | Schmidt | 235/375 |
| 5,260,900 A | * 11/1993 | Muller | 365/189.01 |
| 5,448,045 A | * 9/1995 | Clark | 235/382 |
| 5,457,640 A | 10/1995 | Föller et al. | |
| 5,636,281 A | 6/1997 | Antonini | |
| 5,742,683 A | * 4/1998 | Lee et al. | 380/23 |
| 5,870,140 A | * 2/1999 | Gillberry | 348/160 |
| 5,914,471 A | * 6/1999 | Van De Pavert | 235/380 |

FOREIGN PATENT DOCUMENTS

| | | |
|---|---|---|
| CA | 2022137 | 1/1992 |
| FR | 2601480 | 1/1988 |
| GB | 2 267 476 | 12/1993 |
| JP | 8-273015 | 10/1996 |
| WO | WO 84/01657 | 4/1984 |

OTHER PUBLICATIONS

Patent Abstracts of Japan, vol. 96, No. 9, Sep. 30, 1996, Japanese Application No. 08 123868 A.

* cited by examiner

Primary Examiner—Eric W. Stamber
Assistant Examiner—Hani M. Kazimi
(74) Attorney, Agent, or Firm—Kenyon & Kenyon

(57) ABSTRACT

A host computer is used to enter into a measuring apparatus to be leased, a contracted term of lease and the date when the lease starts, and/or a contracted number of times the measuring apparatus can be used, and the warning time when a warning message should be given. After the warning time, the warning message is displayed. When the contracted term of lease expires or when the measuring apparatus has been used the contracted number of times, a message notifying the user of the expiration of the lease is displayed and/or the functions of the measuring apparatus are disabled.

12 Claims, 8 Drawing Sheets

(a) Entering Conditions (b) Usual Use (c) Warning (d) Restricting Use (e) Clear

SYSTEM FOR RESTRICTING USE OF A MEASURING APPARATUS

FIELD OF THE INVENTION

The present invention relates to a system for restricting the use of an apparatus to be leased to a borrower or user. Depending on conditions or terms of the lease, it may be desired that some functions of the leased apparatus, for example, a measuring apparatus, be made inoperative. The system of the present invention can restrict the functions of a leased measuring apparatus.

BACKGROUND OF THE INVENTION

Usually, when apparatuses, such as a measuring apparatus, are leased, terms or conditions for the lease are stated in a written contract. Because there is no physical connection between the written conditions and the leased apparatus, the written conditions cannot physically restrict the use or functions of the leased apparatus. As a result, the user can intentionally or unintentionally use the apparatus beyond the contracted conditions, which results in the contract being broken.

It is desirable for the leased apparatus to be used only within the written conditions of the lease, so that the lender can manage the leasing satisfactorily.

SUMMARY OF THE INVENTION

According to the present invention, conditions for leasing a measuring apparatus in a written contract are set in the apparatus itself, and the apparatus is provided with, for example, a function to display that, for example, the term for leasing is going to expire or has expired, and a function to make part or all of the functions of the apparatus inoperative. According to the present invention, the lease conditions can be set in the apparatus via a separate condition entering apparatus, such as a computer.

The measuring apparatus can include a use-restricting condition setting section for setting at least one condition for restricting the use of the apparatus. The apparatus also can include a monitoring section which monitors the use of the apparatus and produces a restricting condition fulfillment signal when a predetermined number of the restricting conditions have been fulfilled. A function restricting section of the apparatus is responsive to the restricting condition fulfillment signal to output restricting condition fulfillment representative information and/or to disable at least part of the functions of the measuring apparatus to thereby physically make the measuring apparatus inoperative.

The restricting condition fulfillment representative information may be outputted as visual information, in the form of characters and graphics, or as sound information. The functions which may be disabled include the measuring function. In this case, when part of the functions of the measuring apparatus is disabled, the measuring apparatus may not perform its own function.

When a predetermined number of restricting conditions preset in the apparatus have been met during the use of the measuring apparatus, fulfillment information is output and/or one or more functions of the apparatus are disabled.

A warning condition setting unit may be additionally provided, which enters warning conditions corresponding to the respective restricting conditions into the measuring apparatus. The warning conditions are easier to be met than the restricting conditions. When the monitoring section determines that a predetermined number of the warning conditions have been fulfilled, it produces a warning signal. A warning section is responsive to the warning signal to output warning information in a visual form, e.g. as characters and/or graphics, or in an audio form.

According to the present invention, the measuring apparatus fulfills a predetermined number of warning conditions before fulfilling the restricting conditions, and the warning information is output to warn the user that the restricting conditions will be fulfilled soon.

The system may further include a margin deriving section which compares the current state of use of the measuring apparatus being monitored by the monitoring section with respective ones of the corresponding use-restricting conditions set by the use-restricting condition setting section and provides information indicating the margin left until the use-restricting conditions are fulfilled. The system may also include a margin output section for outputting the margin indicative information as visual information in the form of, e.g. characters and/or graphics, and/or as audio information.

The system with this feature can provide the user with information about the margin for using the leased apparatus until the use-restricting conditions are fulfilled.

The restricting condition setting section may set one or both of the contracted terms of lease during which the user is permitted to use the leased measuring apparatus and the contracted maximum number of times the user is permitted to use the leased apparatus. When the term of lease is set in the measuring apparatus, the monitoring section measures the time from the start of the use of the leased apparatus and provides a condition fulfillment signal when the set term has expired. If the set condition is the number of times permitted for the user to use the measuring apparatus, the monitoring section monitors the number of times the apparatus has been used and produces the condition fulfillment signal when the apparatus has been used the set maximum number of times.

If both the term and the maximum number of times are set, the monitoring section monitors both the time from the start of use and the number of times the apparatus has been used and produces the restriction condition fulfillment signal when either the time or the number of times the measuring apparatus has been used reaches the set value.

Thus, when the contracted term permitted for the user to use the measuring apparatus expires or when the measuring apparatus has been used the contracted maximum number of times, that fact is transmitted to the user or the leased measuring apparatus is made inoperative.

DETAILED DESCRIPTION OF EMBODIMENT

The use-restricting system according to one embodiment of the present invention is described with reference to the accompanying drawings. The invention shown is embodied in a steam trap measuring apparatus for monitoring operation of steam traps disposed in a piping system of a steam plant.

First, a steam trap measuring apparatus is described. When a steam trap leaks steam, ultrasonic vibrations occur in the steam trap. The level of the vibrations and the surface temperature of a housing of the steam trap correlate with the amount of steam leakage. (The surface temperature relates to the steam pressure in the steam trap.) The steam trap measuring apparatus measures the vibration level and the surface temperature of the housing of a steam trap, and determines from the measurements obtained whether the steam trap leaks steam or not. If steam is leaking, the amount or degree of leakage is also measured.

Figure 2:
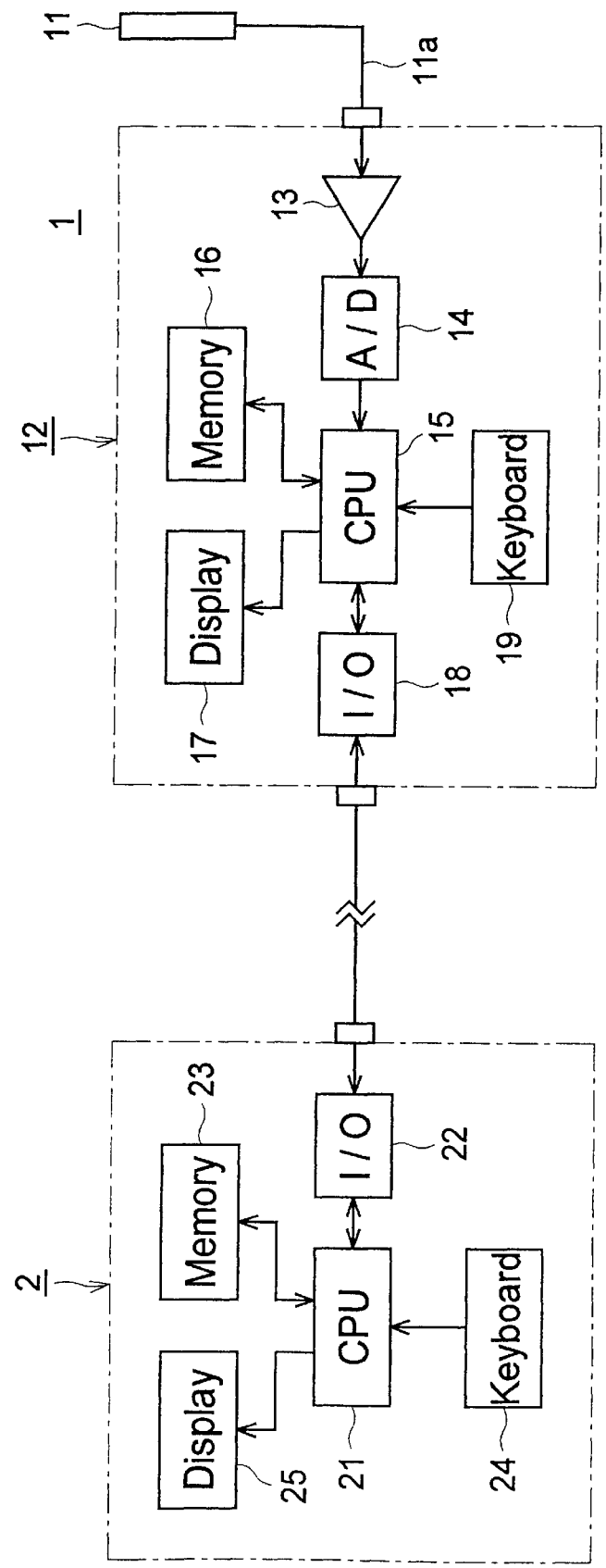
FIG. 2 is a block diagram of a measuring apparatus and a condition setting apparatus usable in the embodiment illustrated in FIG. 1.

For that purpose, as shown in FIG. 2, a steam trap measuring apparatus 1 includes a probe 11 for measuring the vibration level of a steam trap and the surface temperature of the housing of the steam trap, and a data processing section 12 which judges whether or not steam leaks and judges the degree of leakage, on the basis of the measured vibration level and surface temperature.

The probe 11 includes a vibration sensor (not shown) disposed at its tip end and a temperature sensors (not shown). The vibration and temperature sensors start their sensing operation when the tip end of the probe 11 is pressed against the housing surface of a steam trap and develop a vibration-representative signal and a temperature-representative signal, respectively. These signals are fed through a cable 11a to the processing section 12.

In the processing section 12, the vibration-representative signal and the temperature-representative signal are amplified in an amplifier 13 before they are converted into digital form in an A/D converter 14. The resultant digital data or trap measurement data is input into a CPU 15. The CPU 15 processes the input data on the basis of the above-described correlation stored in a memory 16 having, for example, a ROM or RAM configuration. The CPU judges whether steam leaks or not, and, if steam is leaking, it computes the degree of steam leakage. The judgment made by the CPU 15 is displayed on a display 17 which may be a liquid crystal display, for example. The judgment is also stored in the memory 16.

The operation of the CPU 15 is controlled in accordance with a control program stored in the memory 16. The CPU 15 can communicate with a host computer 2, e.g. a personal computer, via an input/output (I/O) interface circuit 18. A data input section 19 having a plurality of push buttons or keys is connected to the CPU 15 for entering instructions for controlling the CPU 15. The judgment made on a steam trap and stored in the memory 16 can be displayed on the display 17 at any time when the user wants to see it.

Figure 3:
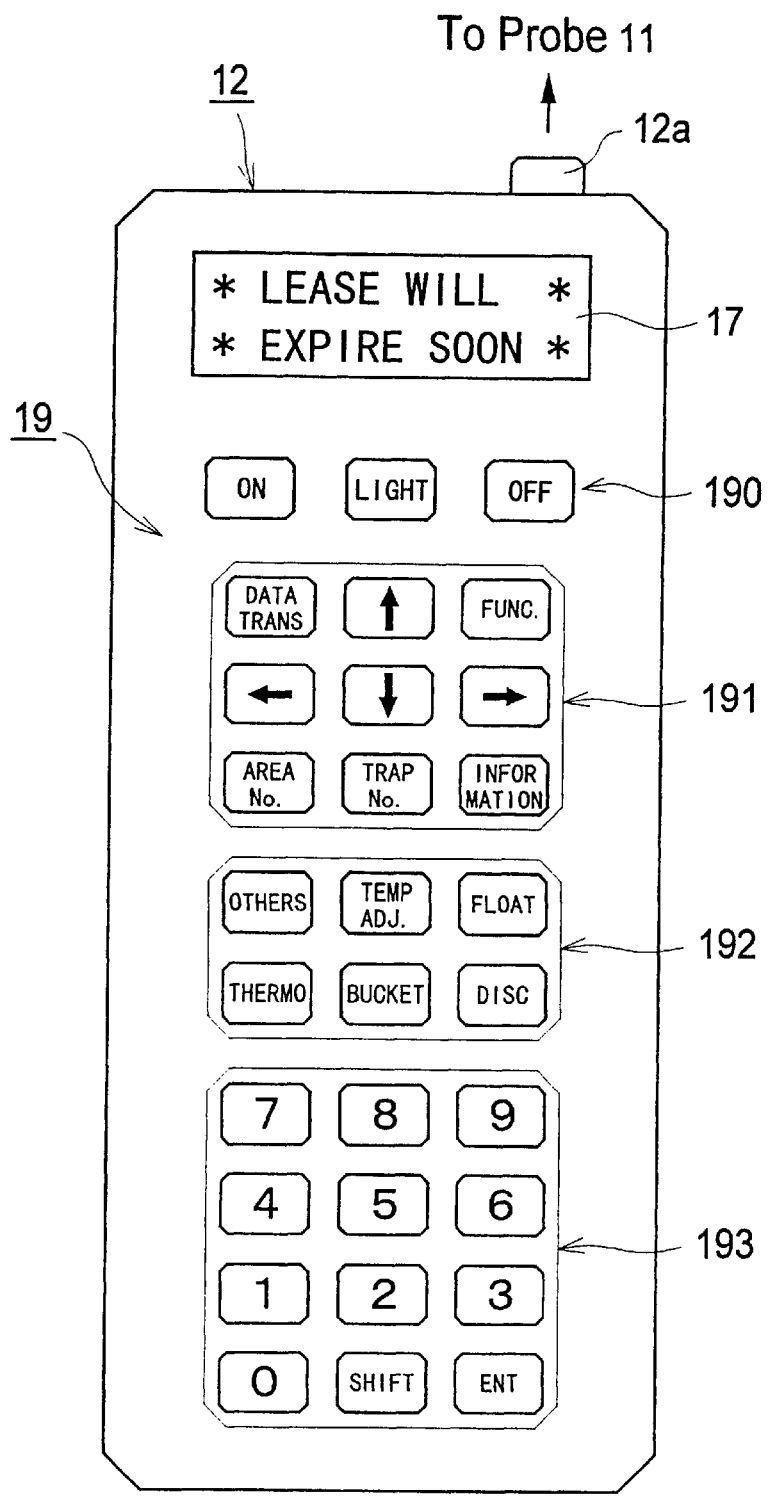
FIG. 3 is a front view of the measuring apparatus shown in FIGURES.

FIG. 3 shows the front view of the processing section 12 of the measuring apparatus 1. The processing section 12 is of generally rectangular shape when viewed from the front, and the input section 19 is disposed on the front surface of the section 12. The data input section 19 includes keys divided into a power supply switch group 190, a function key group 191, a steam trap type selecting key group 192 and a numerical key group 193. Though the data input section 19 includes a number of keys, the keys used with the present invention are "ON" and "OFF" keys in the power supply switch key group 190, "FUNC", "↑" and "↓" keys in the function key group 191, and "6" and "ENT" keys in the numerical key group 193. No explanation is given about the remaining keys, which are known in the art.

The display 17 is in the topmost portion of the data input section 19 and may be a liquid crystal display panel which displays data in two horizontal rows.

An input terminal 12a is provided at the top end of the processing section 12, which is connected via the cable 11a to the probe 11.

The processing section 12 of the measuring apparatus 1 is of such a size that it can be held by hand with the probe 11.

According to the present invention, when the measuring apparatus 1 is leased, the lease conditions are inputted into the memory 16 of the measuring apparatus 1 through the host computer 2, and the operation of the measuring apparatus 1 is physically related to the stored lease conditions so that the borrower or user of the measuring apparatus 1 can know the lease conditions.

The measuring apparatus 1 may be leased under various contracts. For example, it may be leased for a given time period. Alternatively, it may be leased until it is used a given number of times. It may also be leased, setting both a term of lease and a maximum number of times the user is permitted to use it by contract. In this last case, the lease ends at the time when the lease term expires or at the time the measuring apparatus 1 has been used the maximum number of times, whichever comes earlier. Data representing the contract under which the measuring apparatus 1 is leased, i.e. data showing whether it is leased on a lease-term basis, it is leased on a number-of-time-of-use basis, or it is leased a the lease-term and number of-time-of-use basis is stored in the memory 16. At the same time, the contracted lease term and/or number of times of use are also stored in the memory 16.

When the leased measuring apparatus 1 has been used for the contracted lease term or when the measuring apparatus 1 has been used the contracted number of times, a message indicating that fact is displayed on the display 17, or the measuring apparatus 1 is made inoperative.

The measuring apparatus 1 is also arranged to display on the display 17 a warning message to warn the user that the lease will end in a short time or when the measuring apparatus 1 is used some additional number of times. It is also arranged that the lease term left or the number of times of use left is displayed by pressing a predetermined key.

The operation of the measuring apparatus 1 is controlled by the CPU 15 in accordance with the programs stored in the memory 16.

The host computer 2 for entering the contracted conditions into the measuring apparatus 1 may be a personal computer. The host computer 2 is connected to the measuring apparatus 1 only when it is used to enter or remove data representing the contracted conditions into and from the measuring apparatus 1. As shown in FIG. 2, the host computer 2 is connected to the measuring apparatus 1 via a data transmission cable 3 having, for example, the RS-232C cable configuration. More specifically, a CPU 21 of the host computer 2 shown in FIG. 2 is connected to the CPU 15 of the measuring apparatus 1 via an I/O circuit 22 in the host computer 2, the transmission cable 3, and the I/O circuit 18 in the measuring apparatus 1. When setting the lease conditions in the measuring apparatus 1, digital data including contracted use-restricting conditions for restricting the use of the measuring apparatus 1 is transmitted to the CPU 15 through the I/O circuits 22 and 18 and the cable 3.

The CPU 21 operates in accordance with the programs stored in a memory 23 of the host computer 2 to set or remove the use-restricting conditions. Such programs are installed by a recording medium (not shown), e.g. a floppy disc and/or a CD-ROM.

The use-restricting conditions and any other data can be entered into the CPU 21 via a data input section 24, e.g. a key board or a mouse. The data entered through the section 24 can be displayed on a display 25, e.g. a CRT, for verification.

The above-described operation is now described in greater detail with reference to FIG. 1.

Figure 1:
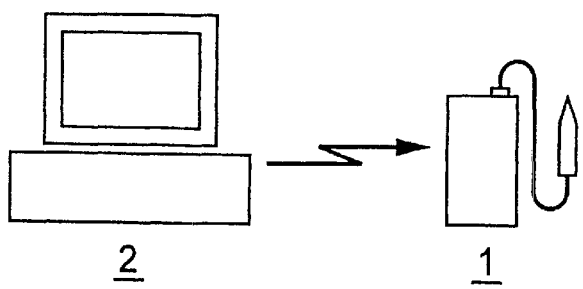
FIG. 1 illustrates how a use-restricting system according to an embodiment of the present invention is used.
Figure 1:
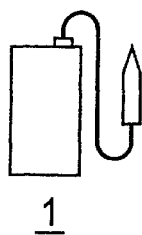
Figure 1:
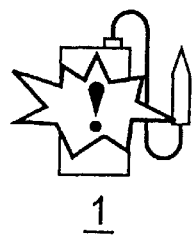
Figure 1:
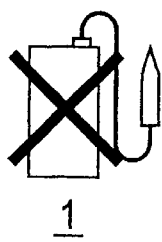
Figure 1:
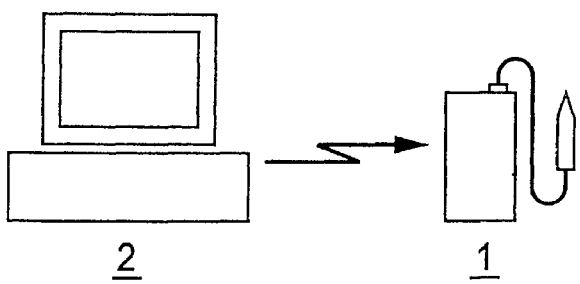

First, the lender connects the host computer 2 to the measuring apparatus 1, as shown in FIG. 1, Part (a). Then, the lender enters the type of lease, namely, for example, whether the apparatus 1 is leased on a lease-term basis, on a number-of-time-of-use basis, or on a lease-term and number-of-time-of-use basis. Then, various use-restricting conditions associated with the entered lease type are set through the host computer 2. For example, if the measuring apparatus 1 is to be leased for a predetermined time, the term for the lease and the date on which the lease becomes effective are entered. Also, the date on which the warning message should be displayed is entered, so that the warning message can be given at an appropriate time before the expiration of the lease. Alternatively, data indicating how many days before the expiration of the lease term the warning message should be displayed may be entered instead.

If the measuring apparatus 1 is leased on a number-of-time-of-use basis, the maximum number of times the user or borrower can use the apparatus 1 is also entered. In addition, the number of times of use of the measuring apparatus 1 upon which the warning message should be displayed is also entered. Alternatively, data indicating how many times the measuring apparatus 1 can be used after the warning message is given may be entered instead.

If the measuring apparatus 1 is leased on a lease-term and number of-time-of-use basis, the term of lease, the date on which the lease becomes effective, the date on which the warning message should be displayed, the maximum number of times the user or borrower can use the apparatus 1, and the number of times the measuring apparatus 1 is to be used for displaying the warning message, are also entered. Of course, data indicating how many days before the expiration of the lease term the warning message should be displayed can be entered in place of the date on which the warning message should be displayed. Also, data indicating how many times the measuring apparatus 1 can be used after the warning message is given can be entered in place of the number of times of use of the measuring apparatus 1 upon which the warning message should be displayed.

For example, if the measuring apparatus 1 is leased for a lease term of one year or 365 days, data representing 365 days is entered together with data representing a date, e.g. Jul. 15, 1998, on which the measuring apparatus 1 is leased are entered. Also, data representing a date on which the warning message should be displayed, for example, Jun. 15, 1999, is entered. Alternatively, data representing a fixed number of days, e.g. 30 days, may be entered, so that the warning message can be displayed thirty days before the expiration of the lease term, i.e. on Jun. 15, 1999 in the present example.

If the measuring apparatus 1 is leased for use, for example, a thousand (1,000) times, data representing 1,000 times is entered. In addition, data representing, for example, 900 times is also entered, which indicates that the warning message should be displayed when the measuring apparatus 1 has been used nine hundred times. Alternatively, data representing a fixed value of, for example, 100 may be entered so that the warning message is displayed when the measuring apparatus 1 has been used a number of times which is equal to the maximum number of times the user can use the measuring apparatus 1 minus 100. Since the maximum number in this example is 1,000, the warning message is displayed when the measuring apparatus 1 is used 900 times (=1,000–100).

Let it be assumed that the measuring apparatus 1 is leased, under a contract with the same lease term, the same lease starting day, the same maximum number of times of use, the same warning date and the same warning number as in the above-described two examples. In this case, data representing 365 days, Jul. 15, 1998, Jun. 15, 1999 (or 30 days from the last date of lease), 1,000 times of use, and 900 (or 100 times before the last permitted use) is entered. In this example, if the measuring apparatus 1 is used a thousand times before Jul. 15, 1999, the lease is terminated, though the lease term has not yet expired. On the other hand, on Jul. 15, 1999, the lease is terminated even if the measuring apparatus 1 has not yet been used a thousand times.

When all of the required data is entered, the use-restricting conditions are transmitted to the measuring apparatus 1. Thus, the measuring apparatus 1 is ready for leasing.

The borrower can use the leased measuring apparatus 1 in a usual manner (FIG. 1, Part (b)) until the warning is given. If the borrower wants to know the type of lease, the remaining time period or number of times the user can use the apparatus 1, he can push the "FUNC" key on the input section 19 of the measuring apparatus 1 and then push the "6" key, so that the required information is displayed on the display 17.

Assuming that when it becomes time for the warning to be given, the measuring apparatus 1 is not being operated. Then, when the user switches on the measuring apparatus 1, the warning message like the one shown in FIG. 3 indicating that the lease term will expire soon is displayed on the display 17 as shown in FIG. 1, Part (c). When the user presses either one of the "↑" and "↓" keys, the time period left or the number of times left the user can use the leased measuring apparatus 1 is displayed. Any displayed message on the display 17 can be erased by pressing the "ENT" key.

The user may continue to use the measuring apparatus 1, and, then, the lease term expires or the number of time the apparatus 1 has been used reaches the set maximum number of times. Then, as shown in FIG. 1, Part (d), a message indicating that the lease has expired is displayed on the display 17, and, at the same time, all the keys except the "ON" and "OFF" keys for turning on and off the measuring apparatus 1 are made ineffective. That is, the use of the measuring apparatus 1 is restricted. Once the lease ends, even if the power supply is turned on after the power is turned off, the lease expiration message is displayed again.

The measuring apparatus 1 then is returned to the lender, who connects it to the host computer 2 to clear all the data regarding the lease conditions which previously have been set in the measuring apparatus 1 to initialize it, as shown in FIG. 1, Part (e). When initialized, the measuring apparatus 1 is identical with other similar apparatuses in the market.

Figure 4:
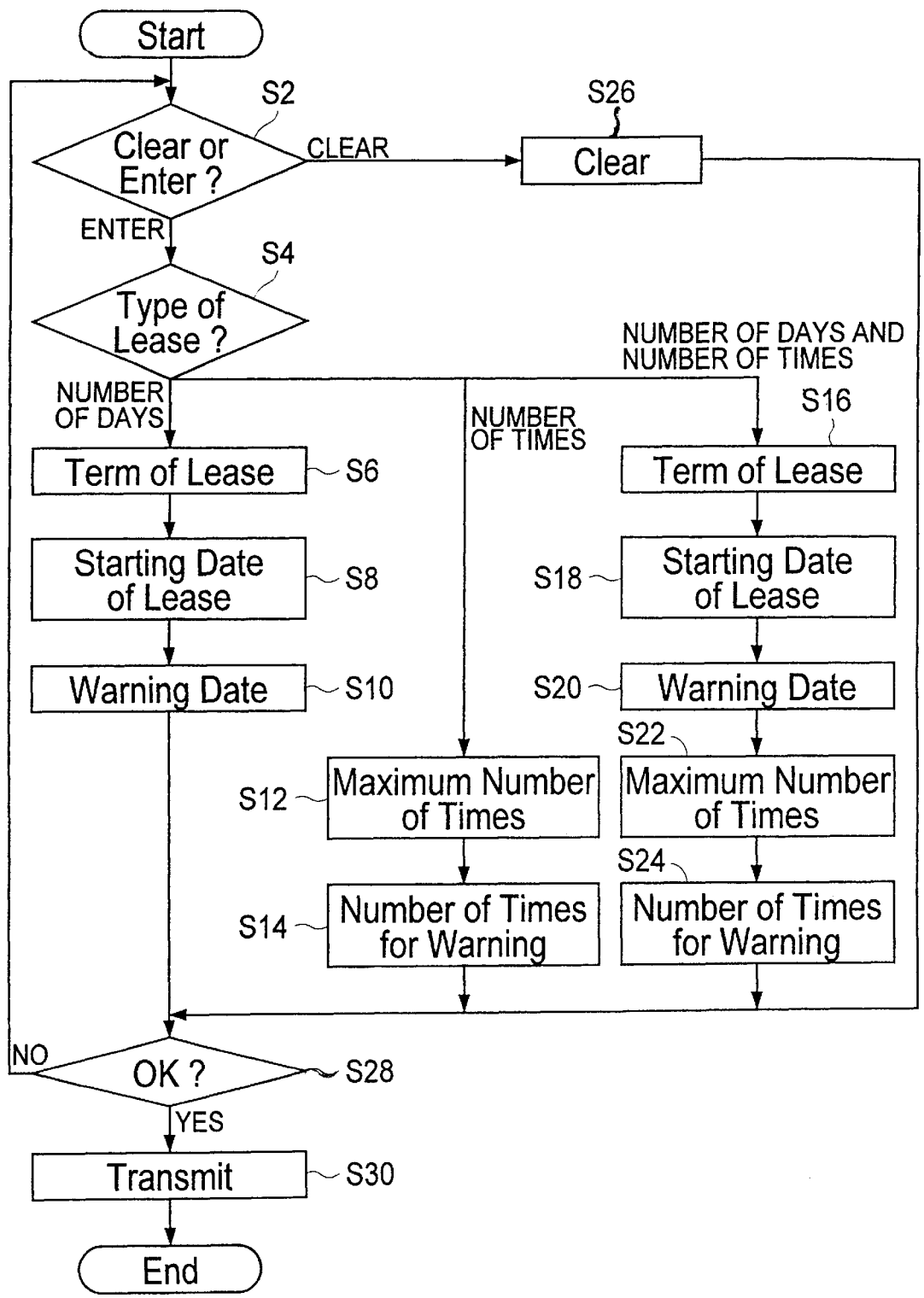
FIG. 4 is a flow chart illustrating the operation of a CPU in a host computer used as the condition setting apparatus shown in FIG. 2.

For realizing the described operation of the system, the CPU 21 of the host computer 2 operates in accordance with the flow chart shown in FIG. 4.

First, the CPU 21 makes a judgement as to whether the instructions given to it through the input section 24 are ones for setting the lease conditions or ones for clearing the conditions which have been set in the measuring apparatus 1 (Step S2). For setting the lease (as indicated as "ENTER"), the type of lease is judged (Step S4).

If the type of lease is a lease-term basis lease (indicated as "NUMBER OF DAYS"), the term or time period for lease is first entered (Step S6), then, the date on which the lease starts or the user can start using the apparatus 1 is entered (Step S8), and the date on which the warning should be given to the user is entered (Step S10).

If the measuring apparatus 1 is leased on a number-of-time-of-use basis (as indicated as "NUMBER OF TIMES"), the maximum allowed number of times the used can use the apparatus 1 is first entered (Step S12), and, then, the number of times the measuring apparatus 1 is to be used, when the warning should be given to the user is entered (Step S14).

If the measuring apparatus 1 is leased on a lease-term and number of-time-of-use basis (indicated as "NUMBER OF DAYS AND NUMBER OF TIMES"), the term for lease (Step S16), then, the date on which the lease starts (Step S18), then, the date on which the warning should be given to the user (Step S20), then, the maximum allowed number of times the used can use the apparatus 1 (Step S22), and, then, the number of times the measuring apparatus 1 is to be used, at which the warning should be given to the user (Step S24) are successively entered If it is judged in Step S2 that the host computer 2 is used not to enter the lease conditions, but to clear all the conditions set in the measuring apparatus 1 (as indicated as "CLEAR"), the processing advances to Step S26 for preparation for the clearing of all the conditions set in the measuring apparatus 1.

When the entering of the necessary data or the preparation for the clearing of the set data is finished, whether the setting of the data or use-restricting conditions in the measuring apparatus may be actually done or whether the conditions set in the measuring apparatus 1 may be cleared is judged (Step S28). If it is necessary to change the data entered including the command to clear the data in the apparatus 1 (i.e. the answer to the interrogation in Step S28 is NO), the processing returns to Step S2 where new data is entered. On the other hand, if the answer to Step S28 is YES, data to be set in the measuring apparatus 1 or instructions to clear the data set in the measuring apparatus 1 is transmitted from the host computer 2 to the measuring apparatus 1 (Step S30). Then, the CPU 21 ends its operation.

Figure 5:
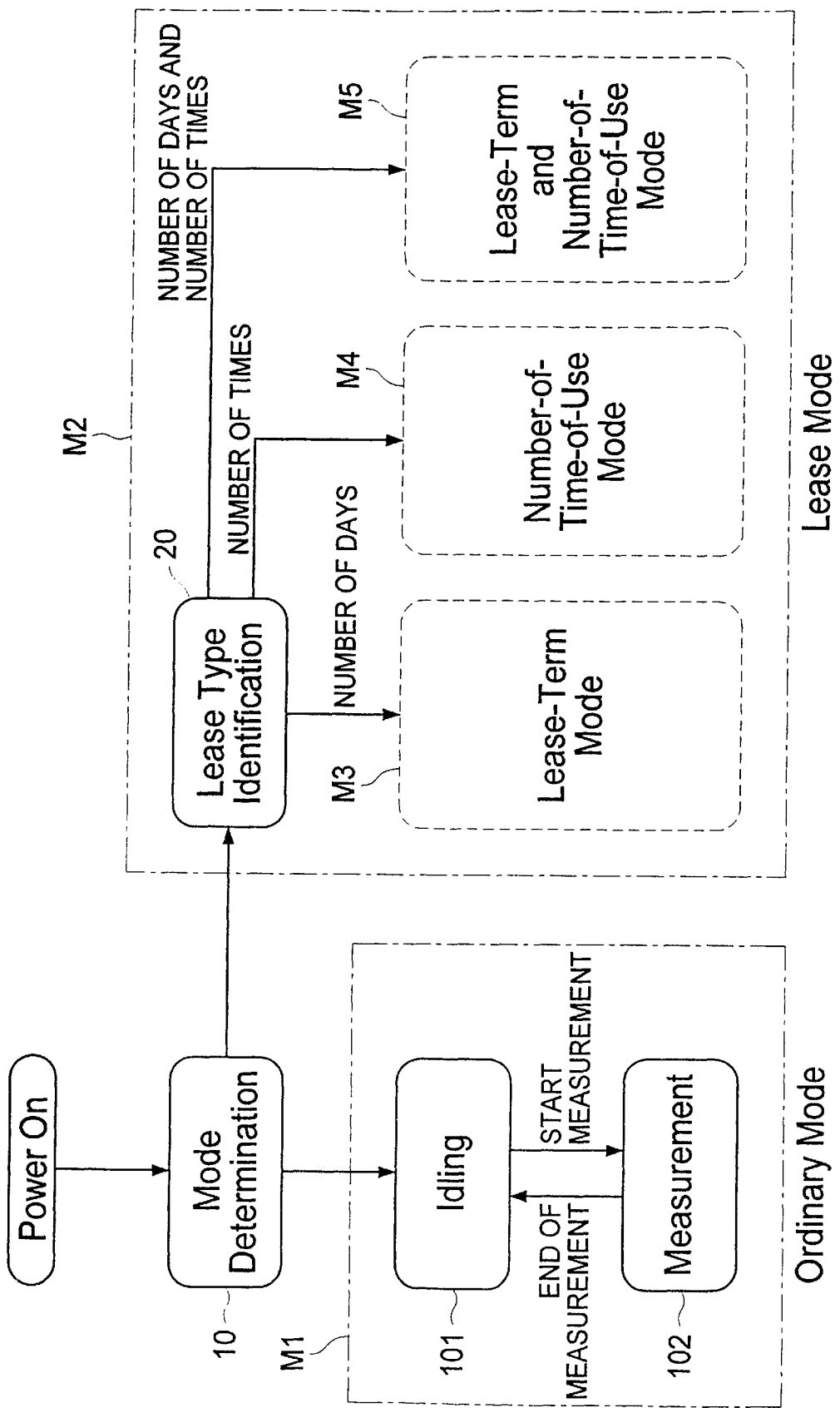
FIG. 5 is a state transition diagram schematically illustrating the operation of a CPU in the measuring apparatus.

On the other hand, the CPU 15 of the measuring apparatus 1 operates in the manner shown in FIGS. 5 through 8. FIG. 5 is a state transition diagram which schematically illustrates the operation of the CPU 15.

Figure 6:
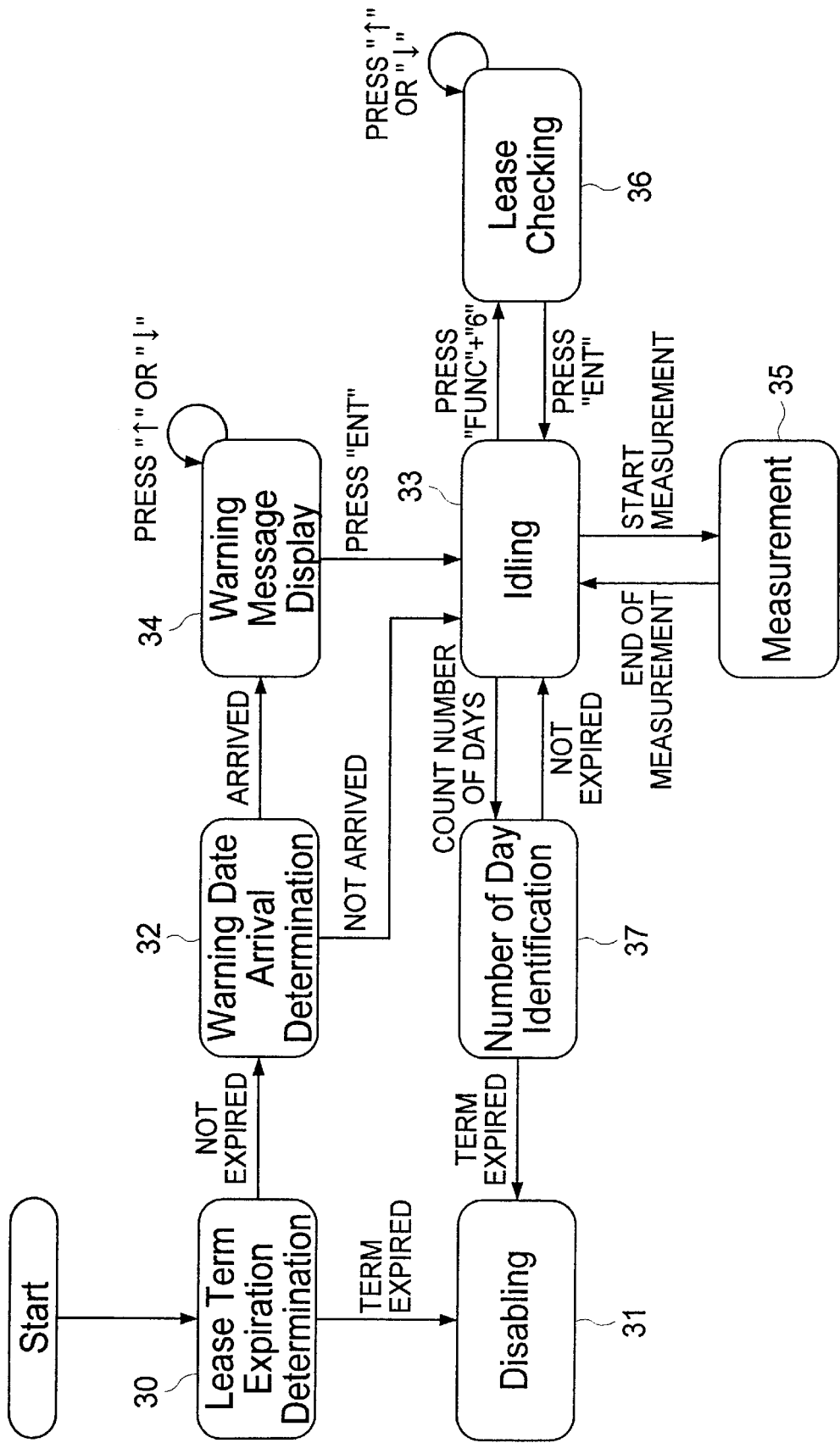
FIG. 6 is a detailed illustration of part of the state transition diagram of FIG. 5.
Figure 7:
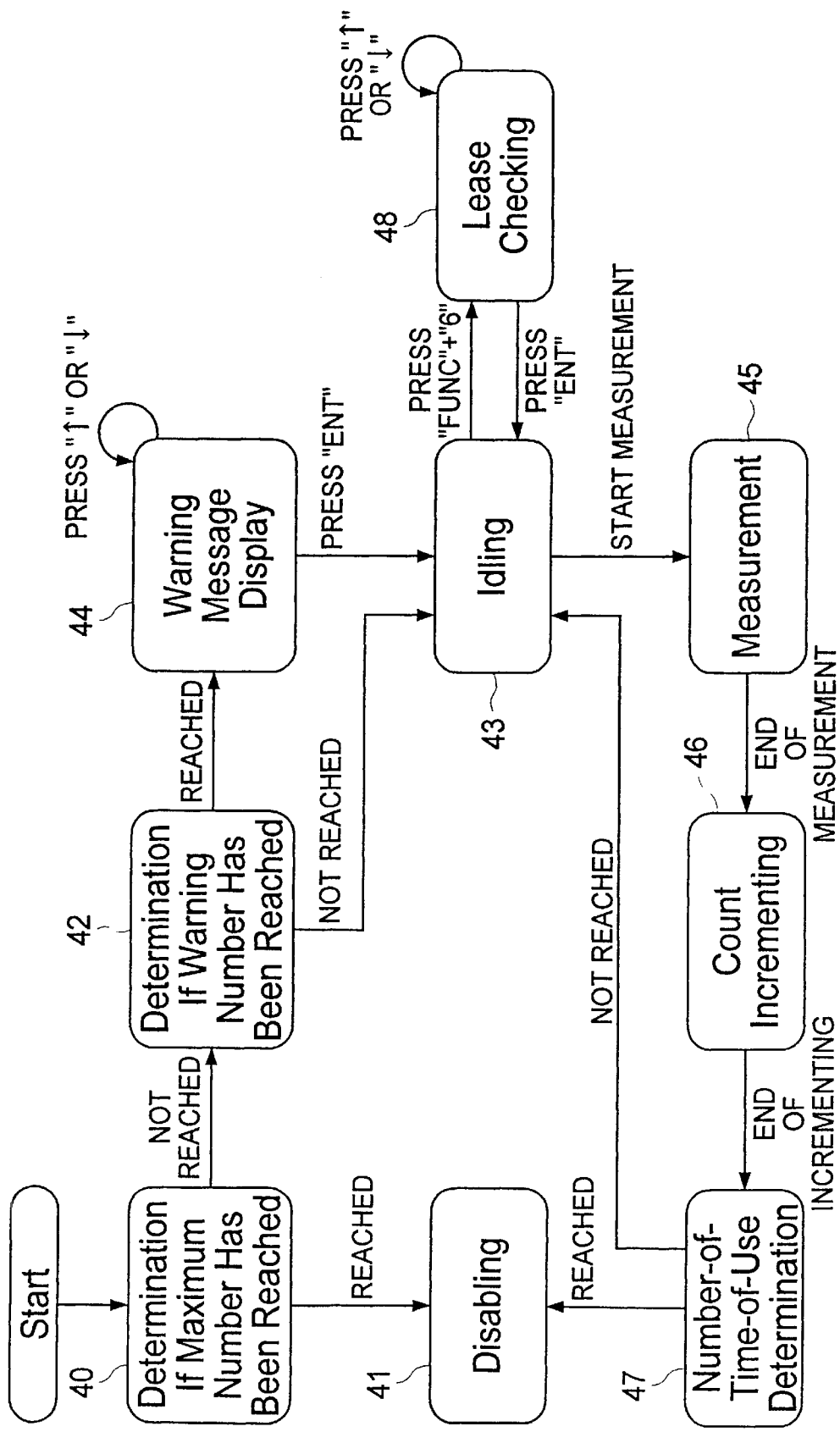
FIG. 7 is a detailed illustration of a different part of the state transition diagram of FIG. 5.
Figure 8:
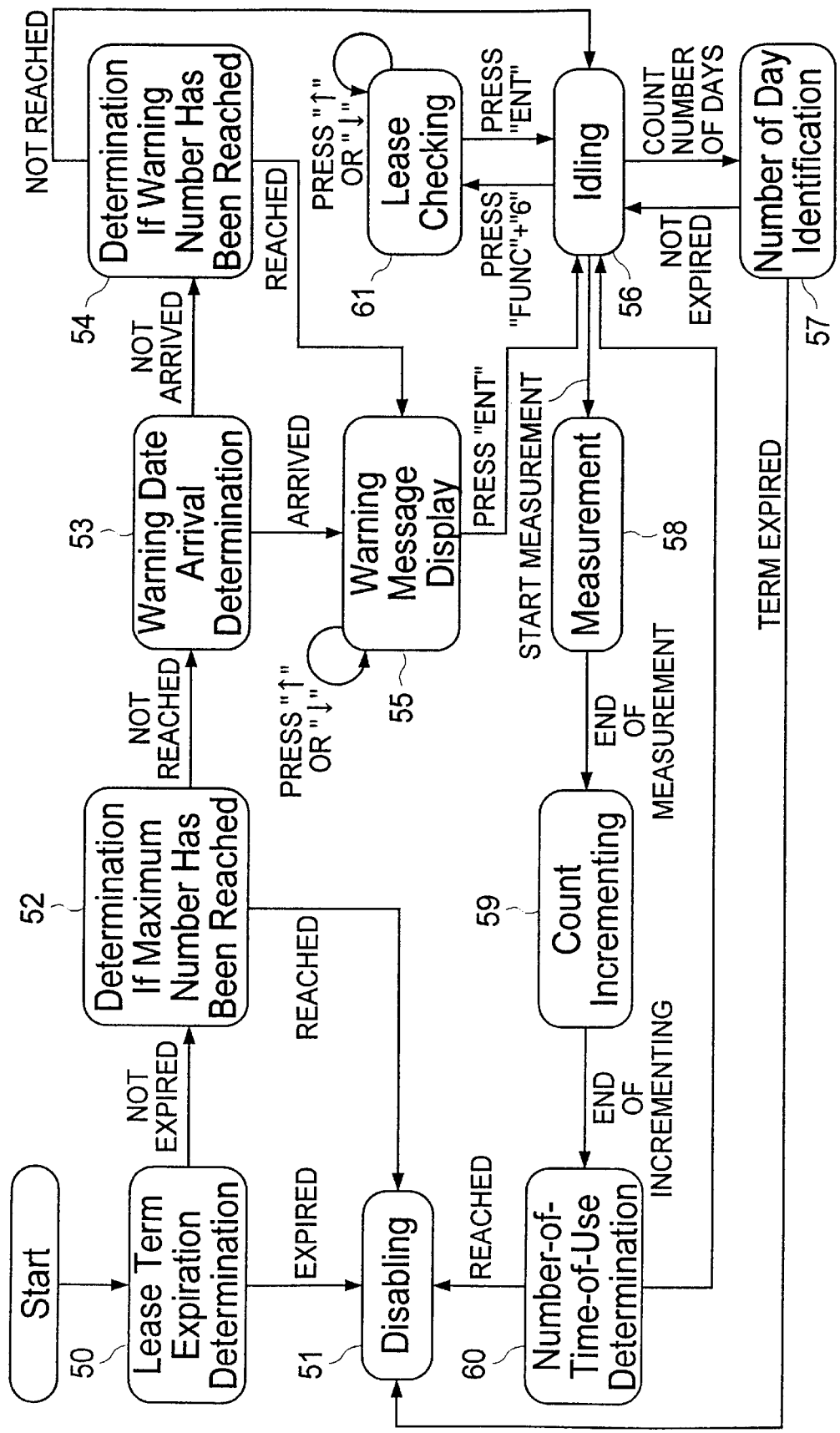
FIG. 8 is a detailed illustration of still another part of the state transition diagram of FIG. 5.

As shown in FIG. 5, the data transmitted from the host computer 2 to the measuring apparatus 1 sets the measuring apparatus 1 to operate either in a mode M1 in which the apparatus 1 operates as a usually sold one or in a mode M2 in which the measuring apparatus 1 operates as a leased one. The mode M2 includes three modes M3, M4 and M5. In the mode M3, the measuring apparatus 1 is operated on a lease-term basis. In the mode M4, it is operated on a number-of-time-of-use basis, and in the mode M5, the measuring apparatus is operated on a lease-term and number-of-time-of-use basis. FIGS. 6 through 8 are state transition diagrams of the CPU 15 in the modes M3, M4 and M5, respectively.

First, referring to FIG. 5, the "ON" key is pressed to turn on the measuring apparatus 1, and the CPU 15 enters into a mode determining processing 10 in which judgment as to whether the measuring apparatus 1 is set in the M1 mode or in the M2 lease mode is made. If the apparatus 1 is in the M1 mode, the measuring apparatus 1 is placed in an idling processing 101 in which the CPU 15 awaits a command. The use of the measuring apparatus 1 to examine a steam trap when the CPU 15 is in the idling processing 101 causes the CPU 15 to shift into a measuring processing 102 in which it processes signals from the probe 11 to determine the presence of steam leakage and the degree of leakage. When one measuring cycle is completed, the CPU 15 returns to the idling processing 101 for the next command.

The measuring apparatus 1 can be turned off by pressing the "OFF" key.

In the mode determination processing 10, if the CPU 15 knows that the measuring apparatus 1 has been set to the M2 mode, the CPU 15 first identifies the lease type in a lease type identification processing 20. In other words, the CPU 15 makes a judgment as to in which mode the measuring apparatus 1 is, the M3 mode, the M4 mode or the M5 mode.

First, the operation of the CPU 15 in the M3 mode is described with reference to FIG. 6. The CPU 15 determines whether the term of lease set through the host computer 2 has expired or not in a lease term expiration determining processing 30. If the lease term has already expired, the CPU 5 enters into a disabling processing 31 and causes a message to notify the user that the lease term has expired on the display 17. At the same time, the CPU 15 makes all the keys except the "OFF" key inoperative.

If the CPU 15 determines that the lease term has not yet expired in the lease term expiration determining processing 30, the CPU 15 enters into a warning date arrival determining processing 32. In the warning date arrival determining processing 32, the CPU 15 judges whether the time period from the beginning of the lease, during which the apparatus 1 has been used, is longer than the lease term minus the set warning time period. Alternatively, the CPU 15 may make a judgment as to whether the day on which the measuring apparatus 1 is being used is earlier or later than the warning date on which a warning message is to be displayed. If the warning date has not yet come, the CPU 15 enters into an idling processing 33.

On the other hand, if the warning date has already come, the CPU 15 enters into a warning message displaying processing 34 to display the warning message on the display 17. In this warning message displaying processing 34, if the user presses either one of the "↑" and "↓" keys, the CPU 15 causes the display 17 to display the number of days left before the expiration of the least term. When the user presses the "ENT" key, the message on the display 17 is cleared and the CPU 15 enters into the idling processing 33.

In the idling processing 33, as in the idling processing 11 in the M1 mode, the CPU 15 waits for a command. If the measuring apparatus 1 is used to examine a steam trap while the CPU 15 is in the idling processing 33, the CPU 15 enters into a measuring processing 35. When the measuring is over, the CPU 15 returns to the idling processing 33.

The CPU 15 is always counting days for time management. When a day count is incremented, the CPU 15 enters into a number-of-day identifying processing 37 in which the counted number of days from the beginning of the lease is added to the lease beginning day to determine the current date. When the current date becomes the date on which the lease expires, the CPU 15 enters into the disabling processing 31 to restrict the use of the measuring apparatus 1 as described before.

If the current date is earlier than the date on which the lease is to expire, the CPU 15 computes the number of days left and returns to the idling processing 33.

Pressing the "6" key after the "FUNC" key is pressed when the CPU 15 is in the idling processing 33, the CPU 15 enters into a lease checking processing 36. In the lease checking processing 36, the CPU 15 causes lease information, such as the leasing basis, the lease term and the number of days left, to be displayed on the display 17. However, the display 17 cannot display all of these messages at a time. In such a case, either one of the "↑" and "↓" keys can be pressed, which causes the display to be scrolled so that all the message can be read. In order to make the CPU go out of the lease checking processing 36, the "ENT" key is pressed, and the CPU 15 returns to the idling processing 33.

Next, the M4 mode is described with reference to FIG. 7.

The M4 mode is the mode in which the measuring apparatus 1 is leased on a number-of-time-of-use basis. That is, the lease contract is such that when the measuring apparatus 1 is used a predetermined number of times, the lease ends. In the M4 mode, the CPU 15 first enters into a processing 40 for determining if the contracted maximum number of times the user is allowed to use the measuring apparatus 1 by contract has been reached. If the measuring apparatus 1 has been used more than the maximum number of times set by the host computer 2, which means that the lease has already expired, the CPU 15 enters into a disabling processing 41. In the disabling processing 41, as in the disabling processing 31 in the above-described M3 mode, a message notifying the user that the lease has already expired is displayed on the display 17, and all of the keys except the "OFF" key are made inoperable.

If the CPU 15 finds that the measuring apparatus 1 has been used less than the set maximum number of times of use, it enters into a processing 42. The processing 42 is for determining if the measuring apparatus 1 has been used a warning number, i.e. a number of times set through the host computer 2, at which a warning is to be given to the user. If the warning number has not been reached yet, the CPU 15 enters into an idling processing 43.

If the number of times the measuring apparatus 1 has been used has reached or exceeded the set warning number, the CPU 15 enters into a warning message displaying processing 44 and causes a warning message to be displayed. If the user presses either one of the "↑" and "↓" keys while the CPU 15 is in the warning message displaying processing 44, the CPU 15 causes the number of times left for the user to use the measuring apparatus 1 to be displayed on the display 17. Then, in response to the pressing of the "ENT" key, the CPU 15 removes the displayed message and enters into the idling processing 43.

The CPU 15 is awaiting a command in the idling processing 43, as in the idling processing 11 in the M1 mode. Accordingly, if the user starts examining a steam trap with the measuring apparatus 1 while the CPU 15 is in the idling processing 43, the CPU 15 is brought into a measuring processing 45. When the measuring is finished, the CPU 15 shifts into a number-of-measuring-time renewing processing 46 where the number of times of use is renewed by incrementing the count by one. After the renewal operation, the CPU 15 shifts into a number-of-time-of-use determining processing 47, in which whether the renewed number is equal to the set maximum number of times. If the renewed number is greater than the maximum number, the CPU 15 enters into the disabling processing 41 to restrict the use of the measuring apparatus 1.

On the other hand, if the renewed number is equal to or smaller than the set maximum number, the CPU 15 computes the number of times of use left and returns to the idling processing 43.

The pressing of the "6" key following the pressing of the "FUNC" key while the CPU 15 is in the idling processing 43 places the CPU 15 in a lease checking processing 48. In the lease checking processing 48, the CPU 15 causes the lease information, such as the leasing basis, the maximum number of times set and the number of times of use left, to be displayed on the display 17. The display 17 cannot display all of message, but different messages can be displayed in the same manner as done in the lease checking processing 36 in the M3 mode. To exit from the lease checking processing 48, the "ENT" key is pressed.

Next, the M5 mode for a measuring apparatus leased on a lease-term and number-of-time-of-use basis is described with reference to FIG. 8. In the M5 mode, the CPU 15 first enters into a lease-term expiration determining processing 50, in which it determines whether the lease term has expired already or not. If the CPU 15 finds that the contracted lease-term has already expired, it shifts into a disabling processing 51 and causes a message notifying the user that the lease term has already expired to be displayed on the display 17. At the same time, the CPU 15 makes all the keys except the "OFF" key inoperative.

If the CPU 15 finds that the lease term has not yet expired in the lease-term expiration determining processing 50, it enters into a processing 52 for determining whether the measuring apparatus 1 has been used more than the contracted maximum number of times the user can use it. In this processing 52, if the CPU 15 finds out that the measuring apparatus 1 has been used for examining steam traps more than the set maximum number of times, which means that the lease has expired, the CPU 15 enters into the disabling processing 51.

On the other hand, if the number of times of use of the measuring apparatus 1 is not greater than the set maximum number of times, the CPU 15 enters into a warning date arrival determining processing 53, in which it determines whether the time period during which the apparatus 1 has been used since the beginning of the lease is longer than the lease term minus the set warning time period. Alternatively, the CPU 15 can make a judgment as to whether the current date is earlier or later than the set warning date, i.e. the warning date, on which the warning message should be displayed.

If the warning date has already come, the CPU 15 shifts into a warning message displaying processing 55, which causes the warning message to be displayed on the display 17. In this warning message displaying processing 55, if the user presses either one of the "↑" and "↓" keys, the CPU 15 causes the display 17 to display the number of days left before the expiration of the least term. When the user presses the "ENT"key, the message on the display 17 is cleared, and the CPU 15 enters into the idling processing 56.

If the warning day has not yet come, the CPU 15 enters into a processing 54. In the processing 54, the CPU 15 judges whether the number of times the measuring apparatus 1 has been used has reached the warning number. In other words, the CPU 15 judges whether the number of times set through the host computer 2 for giving a warning to the user that the maximum number of times will be reached soon has been reached. If the warning number has not yet been reached, the CPU 15 enters into an idling processing 56.

If the number of times the measuring apparatus 1 has been used has reached or exceeded the set warning number, the CPU 15 enters into the warning message displaying processing 55 and causes the warning message to be displayed.

As described previously, the CPU 15 is counting the days for time management. As one day passes, the day count is incremented by one. Each time the count is incremented, i.e. each time the date is renewed, the CPU 15 shifts into a number-of-day identifying processing 57, in which the number of days counted from the beginning of the lease is added to the lease beginning date to determine the current date. If the current date is later than the date on which the lease is to expire, i.e. if the lease term has already expired, the CPU 15 enters into the disabling processing 51 to restrict the use of the measuring apparatus 1. Specifically, the message to notify the expiration of the lease term is displayed, and all the keys except for the "OFF" key are made inoperative.

If the CPU 15 finds that the current date has not become the last day of the least term, it computes the number of days left and returns to the idling processing 56.

In the idling processing 56, the CPU 15 awaits a command. When the measuring apparatus 1 is used to examine a steam trap, the CPU 15 enters into a measuring processing 58. After the examination or measurement, the CPU 15 enters into a number-of-measuring-time renewing processing 59 where the number of times of use is renewed by incrementing the count by one. After the renewal operation, the CPU 15 shifts into a number-of-time-of-use determining processing 60, in which whether the renewed number is greater than the set maximum number of times. If the renewed number is greater than the maximum number, the CPU 15 enters into the disabling processing 51 to restrict the use of the measuring apparatus 1.

On the other hand, if the renewed number is equal to or smaller than the set maximum number, the CPU 15 computes the number of times of use left and returns to the idling processing 56.

As in the cases of the M3 and M4 modes, the pressing of the "6" key following the pressing of the "FUNC" key while the CPU 15 is in the idling processing 56 places the CPU 15 in a lease checking processing 61. In the lease checking processing 61, the CPU 15 causes the lease information, such as the leasing basis, the lease term set, the maximum number of times set, the time period left and the number of times of use left, to be displayed on the display 17. Though the display 17 cannot display all of message, different messages can be displayed by pressing either one of the "↑" and "↓" keys. It causes the display to be scrolled to display all of the messages. In order to make the CPU 15 go out of the lease checking processing 61, the "ENT" key is pressed, and the CPU 15 returns to the idling processing 56.

As described above, according to the described embodiment, a message notifying the end of a lease is displayed and, at the same time, the use of the leased measuring apparatus 1 is restricted or prevented. Thus, the borrower can know the contents of the lease, and, accordingly, the lease management becomes easy.

The CPU 15 has been described as being controlled in the manner as represented by the state transition diagrams shown in FIGS. 5 through 8, but it can be controlled in any other manners only if the same effects can be obtained.

In the illustrated embodiment, the various conditions for leasing are set in the measuring apparatus 1 through the host computer 2, but they can be directly set into the measuring apparatus 1.

Furthermore, the various messages may be given in the audio form instead of visual display, or may be both in visual and audio forms.

In the above-described example, when the lease term expires, all of the key functions, except those of the "OFF" and "ON" keys, are made inoperative, so that the measuring apparatus 1 cannot function as a measuring apparatus. However, only part of various functions of the measuring apparatus 1 can be made inoperative when the lease term expires. For example, the function to test steam traps may be retained even when the lease term has expired, but the function to store the measurements in the memory 16 may be disabled.

Although the present invention has been described as being embodied in a measuring apparatus for steam traps by way of example, it is also applicable to any measuring apparatuses other than the measuring apparatus for steam traps.

What is claimed is:

1. A use-restricting system for a measuring apparatus, comprising:

a use-restricting condition setting section set in the measuring apparatus, the use-restricting condition setting section including at least one condition for restricting the use of the measuring apparatus;

a monitoring section for monitoring the use of the measuring apparatus and producing a restricting condition fulfillment signal when a predetermined number of the at least one restricting condition has been fulfilled;

a use-restricting section responsive to the restricting condition fulfillment signal and disabling at least part of functions of the measuring apparatus; and an arrangement for causing the measuring apparatus to enter into one of a plurality of modes of operation, each mode of operation being associated with a different type of use-restricting condition.

2. The use restricting system according to claim 1, wherein:

the arrangement for causing is responsive to a selection signal that selects one of the plurality of modes of operation.

3. A use-restricting system for a measuring apparatus, comprising:

a use-restricting condition setting section set in the measuring apparatus, the use-restricting condition setting section including at least one condition for restricting the use of the measuring apparatus;

a monitoring section for monitoring the use of the measuring apparatus and producing a restricting condition fulfillment signal when a predetermined number of the at least one restricting condition has been fulfilled;

a use-restricting section responsive to the restricting condition fulfillment signal and providing restriction condition fulfillment representative information; and an arrangement for causing the measuring apparatus to enter into one of a plurality of modes of operation, each mode of operation being associated with a different type of use-restricting condition.

4. The use restricting system according to claim 3, wherein:

the arrangement for causing is responsive to a selection signal that selects one of the plurality of modes of operation.

5. A method for restricting the use of a measuring apparatus, comprising:

setting at least one condition for restricting use of the measuring apparatus, the setting step being performed in the measuring apparatus;

monitoring the use of the measuring apparatus;

producing a restricting condition fulfillment signal when a predetermined number of the at least one restricting condition has been fulfilled;

disabling at least part of functions of the measuring apparatus in response to the restricting condition fulfillment signal; and causing the measuring apparatus to enter into one of a plurality of modes of operation, each mode of operation being associated with a different type of the at least one restricting condition.

6. The method according to claim 5, wherein:

a performance of the step of causing is responsive to a selection signal that selects one of the plurality of modes of operation.

7. A method for restricting the use of a measuring apparatus, comprising:

setting at least one condition for restricting use of the measuring apparatus, the setting step being performed in the measuring apparatus;

monitoring the use of the measuring apparatus;

producing a restricting condition fulfillment signal when a predetermined number of the at least one restricting condition has been fulfilled;

providing restriction condition fulfillment representative information in response to the restricting condition fulfillment signal; and causing the measuring apparatus to enter into one of a plurality of modes of operation, each mode of operation being associated with a different type of the at least one restricting condition.

8. The method according to claim 7, wherein:

a performance of the step of causing is responsive to a selection signal that selects one of the plurality of modes of operation.

9. A use restricting system for a measuring apparatus, comprising:

a use-restricting condition setting section, the use-restricting condition setting section including at least one condition for restricting the use of the measuring apparatus;

an arrangement for causing the measuring apparatus to enter into one of a plurality of modes of operation, each mode of operation being associated with a different type of use-restricting condition;

a monitoring section for monitoring the use of the measuring apparatus and producing a restricting condition fulfillment signal when a predetermined number of the at least one restricting condition has been fulfilled; and a use-restricting section responsive to the restricting condition fulfillment signal and disabling at least part of functions of the measuring apparatus.

10. A use restricting system for a measuring apparatus, comprising:

a use-restricting condition setting section, the use-restricting condition setting section including at least one condition for restricting the use of the measuring apparatus;

an arrangement for causing the measuring apparatus to enter into one of a plurality of modes of operation, each mode of operation being associated with a different type of use-restricting condition;

a monitoring section for monitoring the use of the measuring apparatus and producing a restricting condition fulfillment signal when a predetermined number of the at least one restricting condition has been fulfilled; and a use-restricting section responsive to the restricting condition fulfillment signal and providing restricting condition fulfillment representative information.

11. A method for restricting the use of a measuring apparatus, comprising:

setting at least one condition for restricting use of the measuring apparatus;

causing the measuring apparatus to enter into one of a plurality of modes of operation, each mode of operation being associated with a different type of the at least one restricting condition;

monitoring the use of the measuring apparatus;

producing a restricting condition fulfillment signal when a predetermined number of the at least one restricting condition has been fulfilled; and disabling at least part of functions of the measuring apparatus in response to the restricting condition fulfillment signal.

12. A method for restricting the use of a measuring apparatus, comprising:

setting at least one condition for restricting use of the measuring apparatus;

causing the measuring apparatus to enter into one of a plurality of modes of operation, each mode of operation being associated with a different type of the at least one restricting condition;

monitoring the use of the measuring apparatus;

producing a restricting condition fulfillment signal when a predetermined number of the at least one restricting condition has been fulfilled; and providing restriction condition fulfillment representative information in response to the restricting condition fulfillment signal.

* * * * *